UNITED STATES PATENT OFFICE.

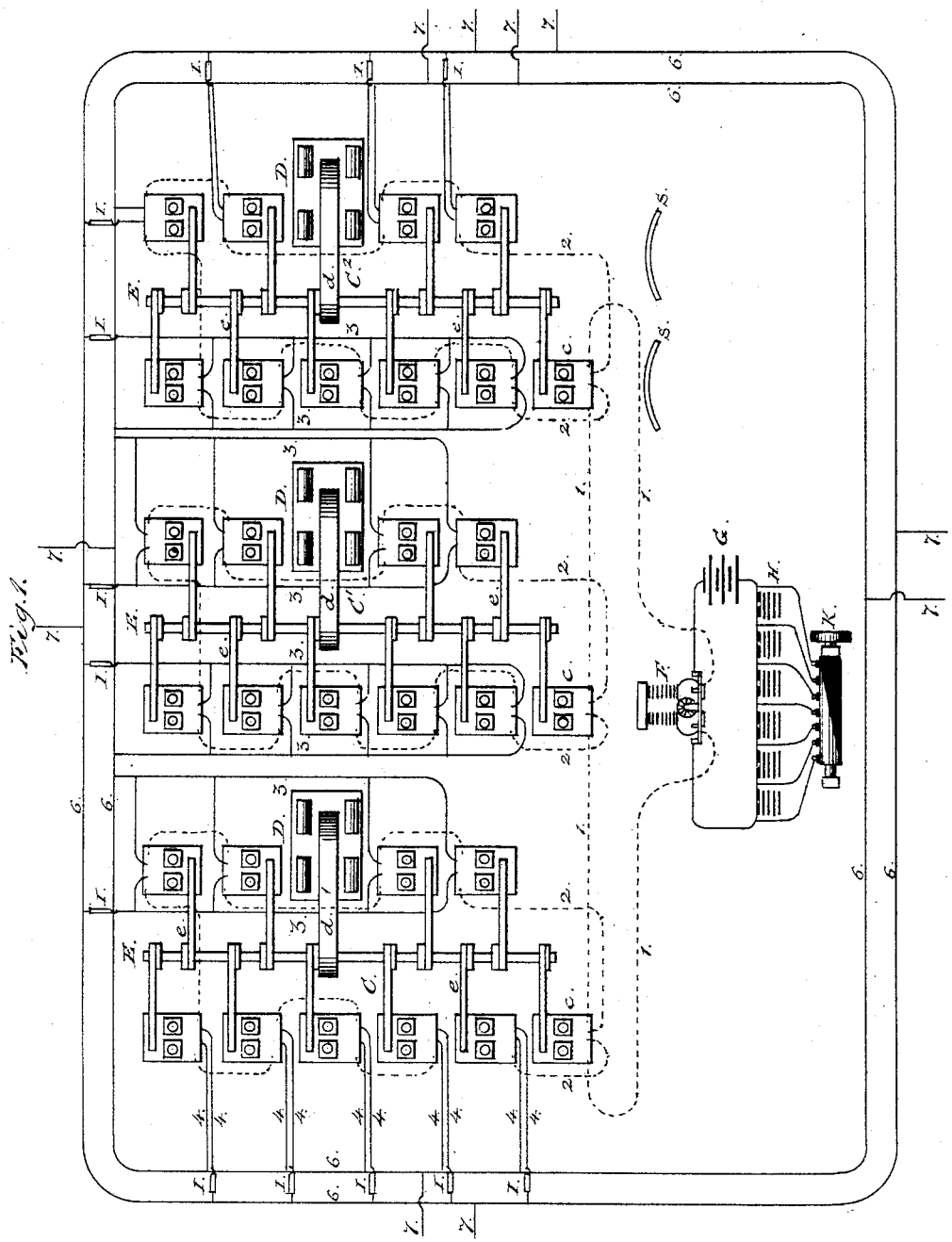

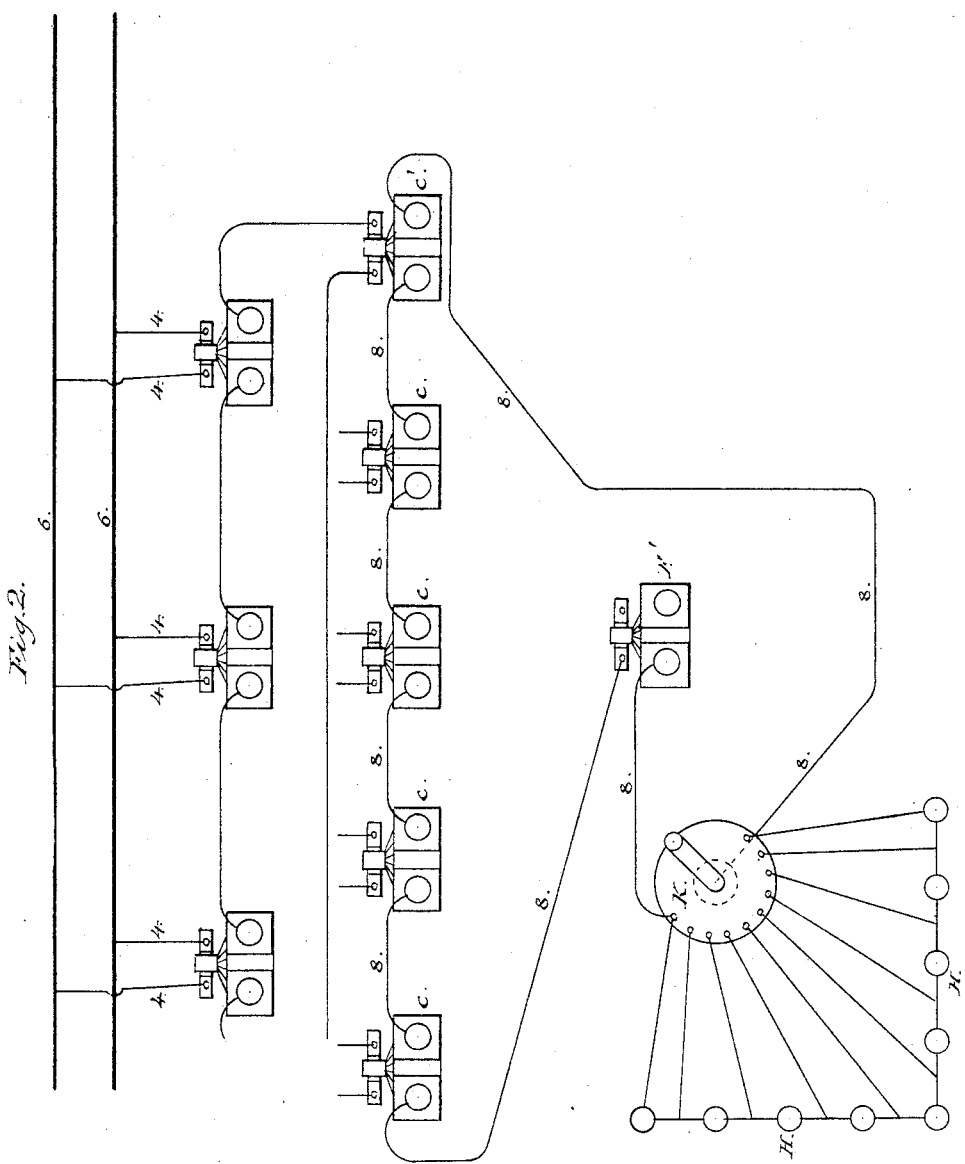

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO OR MAGNETO ELECTRIC MACHINES.

SPECIFICATION forming part of Letters Patent No. 288,318, dated November 13, 1883.

Application filed November 11, 1881. (No model.) Patented in England January 3, 1880, No. 33, and February 11, 1880, No. 602; in Italy May 10, 1880; in Belgium May 15, 1880, No. 51,329; in Victoria June 14, 1880, No. 2,841; in India June 23, 1880, No. 405; in France July 5, 1880, No. 136,399; in Canada July 21, 1880, No. 11,527; in New South Wales July 26, 1880; in Sweden July 29, 1880; in Queensland August 3, 1880; in Austria-Hungary October 5, 1880; in New Zealand October 18, 1880, No. 485; in Portugal October 27, 1880, No. 628; in Spain November 10, 1880, and in Norway December 31, 1880.

*To all whom it may concern:*

Be it known that I, THOMAS A. EDISON, of Menlo Park, in the county of Middlesex and State of New Jersey, have invented a new and useful Improvement in the Regulation of Dynamo or Magneto Electric Machines, (Case No. 358;) and I do hereby declare that the following is a full and exact description of the same, reference being had to the accompanying drawings, and to the letters of reference marked thereon.

In a prior application for Letters Patent of the United States, made by me on February 5, 1880, of which this application is a division, is set out a complete system for the generation, indication, regulation, distribution, consumption, and measurement of electricity for light and motive power. In such system it is contemplated that all the generation, indication, and distribution for a large number of consumers be done at a central station, such central station being the supply center of an area termed a district therein.

In such a system the net resistance of the external circuit is likely to be constantly varying, inasmuch as it is likely that the number of translating devices in circuit and making demands upon the central station for current will be constantly varying. This would lead to variation of pressure, so to speak, of current in the circuit. It is essential, however, that just sufficient energy be generated and sent through the circuit to keep up an equal flow through each translating device—that is, that a uniform pressure be maintained in the circuit of each translating device in circuit, whether more or less such devices be in circuit. To supply the demands upon such a central station of a district, it is necessary that a large number of generators be there grouped, arranged so that more or less thereof shall be thrown into action, that the amount of their action shall be controlled so that just the needed supply may be furnished.

To so arrange a number of generators that the generative capacity of all in circuit at any one time may be readily and definitely regulated by one operation, or the operation of one device, in order that the essentials before set forth be attained, is the object of this invention, which is particularly hereinafter set out and claimed.

A number (two or more) of generators are arranged to be driven by any suitable prime motor. If these were used as dynamo-machines proper—that is, if the field-of-force coils and the generating coils were included in one circuit, and all the current generated were passed through the field-magnet coils, a very much greater amount of current than necessary for the maintenance of a practical magnetic maximum in the field-of-force magnets would be passed around them, and the coils acting as resistances to the energy in excess of that required to magnetize the magnets to their practical maximum, a great waste of energy would ensue. Hence the field-of-force coils and the generating-coils are kept separate, one machine of the number before alluded to being set apart to supply the energy for the field-of-force coils of the remainder of the number, the number given it to feed being properly adjusted to its capacity. The one so set apart is for convenience hereinafter termed the "field-generator," and it and the generators fed by it are termed "supply," "generative," and, collectively, a "battery." This field-generator may be energized by the current from a galvanic battery or other source of energy, or it may be a dynamo-machine, its own field-coils being included in its own circuit. With it are combined means for varying instantly and at will the strength of the current passing around its field. As such variation reacts upon the field-magnets correspondingly varying the magnetic field in which its generative coils rotate, the reaction extends to the current generated, varying the force of the fields of the supply-generators, and hence ultimately the current sent therefrom into the circuit external to the station. It will be understood that this regulation of the magnet of the field-generator is performed below the point of saturation of the magnet, the current supplied to the magnet-coils being varied from a quantity sufficient to produce saturation, as a maximum, to a quantity producing the weakest magnetic effects desired as a minimum. So, by simply regulating the current passing around the field of one machine, the generation of current by a large number of machines connected to a supply-circuit is regulated instantly and at will.

When it is desired to use several batteries of generators, one in each battery is set apart as the field-generator; but the entire number of field-generators are energized by an extra generator provided with means of regulation, in which case such extra generator is termed the "prime field-generator." The foregoing is clearly shown in the drawings, in each of which several batteries of generators are indicated, and in which Fig. 1 shows a prime field-generator energized by the current of a galvanic battery; and Fig. 2 shows the prime field-generator as a dynamo. In Fig. 1 three batteries, C C' C², of generators are shown, which number may be increased or diminished as circumstances may require. In each battery one generator, $c$, is set apart as the field-generator, the circuit therefrom passing through the field-coils of all the remaining or supply generators of the battery, as shown in broken lines 2 2. For actuating the rotative portions of the supply-generators an engine, D, is used with each battery, connected by belt $d$ to line of shafting E, from which belts $e$ pass to the supply-generators; or, if preferred, each supply-generator may be provided with its own special engine. The generative coils of the supply-generators in C' and C² are connected in multiple-arc to conductors 3 3, which in turn are connected in multiple-arc to the main conductors 6 6, from which lead supply-conductors or "mains" 7 7 throughout the district or territory to be supplied; or the supply-generators may be connected directly in multiple-arc to 6 6, as shown in C. The field-of-force coils of the field-generators $c\ c\ c$ are energized by current from the prime field-generator F, whose circuit for this purpose is shown in broken lines 1 1. As here shown, its field-coils are traversed by current from the galvanic battery G, although it is evident that any other suitable source of energy may be used. In the circuit of G is interposed a series, H, of resistances connected to a cut-out, K, by which more or less of said resistances are thrown into the circuit of G. This forms a very effective and simple method of regulating the generative capacity of the batteries of supply-generators, for by the resistances the current in the field-coils of the prime field-generator is strengthened or weakened, affecting its generation, which reacts upon the field-generators $c$, reacting then upon the supply-generators, the variation in the circuit of G being immediately followed by variation in the current generated in the batteries.

Where only one battery is to be used, the resistances and cut-out are placed directly in the field-circuit of the field-generator $c$ of such battery.

In Fig. 2, $c\ c\ c\ c$ are the field-generators of batteries not shown, while $c'$ is the field-generator of a battery of which three supply-generators are shown, connected to conductors 6 6, as before explained. In this case the prime field-generator F' is a dynamo-electric machine, all its coils being included in one circuit, 8 8, which passes through the field-coils of the field-generators $c\ c\ c\ c'$. The same principle of regulation is used, however, the resistances H and cut-out K being arranged, as shown, directly in the circuit 8 8, through F', causing variation therein, with the result hereinbefore explained—that is to say, the current flowing in the field-magnet circuit 8 8 of the generators $c\ c'$ is primarily and directly varied by variations in the resistance H in said circuit.

The adjustable resistances, which are placed directly in the circuit of the field-magnet coils in either of the arrangements shown, are so proportioned to the resistance of the magnet-coils and to the energy of the source of electrical supply, and these last two elements are so proportioned with relation to each other that when all the resistance is cut out of circuit the current supplied to the field-magnet coils will be sufficient only to saturate or nearly saturate the magnet, producing the maximum magnetic power without waste of energy. The throwing of the resistance into the circuit diminishes the current and weakens the magnet, and in this way the strength of the magnet is primarily and directly regulated and varied.

I do not claim herein the method of operating a battery of generators, consisting in using the entire current of one to supply the fields of the remainder, and throwing the entire current generated by the latter into a circuit for use, as such will form the subject of a separate application; nor do I claim herein a dynamo-electric machine constructed or combined with suitable devices for primarily varying the strength of the current exciting its field-coils, nor, broadly, the combination, with the field-coils of such a machine, of an adjustable resistance, as such subject-matters form the subject of a separate application.

It is to be understood that all further patentable features of invention described or shown, but not claimed herein, are reserved for protection by other patents, and have been or will be embraced in other applications for patents.

What I claim is—

1. The combination, with an electrical generator, of an adjustable resistance in addition and external to the field-magnet coils, and located directly in the field-circuit of the generator, for primarily and directly regulating and varying the strength of the field-magnet below the point of saturation, substantially as set forth.

2. In a battery of generators, the combination of one generator feeding the field of all the supply-generators of the battery, with means for controlling and regulating its current, substantially as set forth.

3. The combination, with a battery of generators and a separate generator supplying the field-current therefor, of means acting on the separate generator to regulate its production of current, and thereby regulate the generative capacity of the entire battery, substantially as set forth.

4. The combination, with a series of batteries of generators, each provided with its own field-current generator, of a prime field-generator supplying the field-current to such battery field-generators, and provided with means for controlling the generative capacity, substantially as set forth.

5. The method of regulating the generative capacity of one battery or of a series of batteries of generators, consisting in primarily regulating the current passing around the field-coils of one or the prime field-generator, substantially as set forth.

6. The combination of a battery or series of batteries of generators, a field or prime field generator, and an adjustable resistance, substantially as set forth.

7. The combination, with the main circuit containing one or more generators and translating devices, of a separate electric circuit having no electrical connection with the main circuit, and supplied with current from a source external to said generator or generators, and means acting upon the separate circuit for controlling and regulating the force or pressure in the main circuit, substantially as set forth.

This specification signed and witnessed this 17th day of October, 1881.

THOS. A. EDISON.

Witnesses:
H. W. SEELY,
C. F. HARRINGTON.